US006522497B1

(12) United States Patent
Kitagawa

(10) Patent No.: US 6,522,497 B1
(45) Date of Patent: Feb. 18, 2003

(54) DISK DRIVE HAVING POSITIONING CONTROL SYSTEM USING LOGICAL CYLINDER ADDRESS INFORMATION

(75) Inventor: Katsuyoshi Kitagawa, Akishima (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 325 days.

(21) Appl. No.: 09/659,682

(22) Filed: Sep. 11, 2000

(30) Foreign Application Priority Data

Dec. 24, 1999 (JP) .......................................... 11-366758

(51) Int. Cl.[7] ............................................... G11B 5/596

(52) U.S. Cl. ............................... 360/78.04; 360/78.14; 360/270

(58) Field of Search .......................... 360/78.04, 78.14, 360/270, 48; 711/4, 114

(56) References Cited

U.S. PATENT DOCUMENTS 5,018,095 A * 5/1991 Nissimov ...................... 711/4
5,202,799 A * 4/1993 Hetzler et al. ................ 360/48
5,206,939 A * 4/1993 Yanai et al. ................... 711/4
5,636,356 A * 6/1997 Kakuta et al. ............. 711/114
5,784,220 A * 7/1998 Nishimura et al. ...... 360/78.14
5,943,179 A 8/1999 Fukushima
6,078,447 A * 6/2000 Sim ........................... 360/48

FOREIGN PATENT DOCUMENTS

JP 5-128766 5/1993

* cited by examiner

*Primary Examiner*—David Hudspeth
*Assistant Examiner*—Fred F. Tzeng
(74) *Attorney, Agent, or Firm*—Finnegan, Henderson, Farabow, Garrett & Dunner, L.L.P.

(57) ABSTRACT

A disk drive is provided which uses a disk having a maximal limit cylinder group formed based on an initially recorded servo data before being assembled in a drive body. A CPU sets an actually usable data recording area on the disk by seeking the head in a radial direction over the disk. Further, the CPU allows the generation of a translation table for obtaining a correspondence between inherent physical cylinder address information of an effective cylinder group contained in the set data recording area and logical cylinder address information set to identify the effective cylinder group and allows the translation table to be stored in a memory. The CPU refers to the translation table when, in response to an access request from a host system, control is made to position a head to a target position, and finds physical cylinder address information corresponding to the target cylinder.

6 Claims, 4 Drawing Sheets

START
SET DISK RECORDED SERVO DATA IN DRIVE — S1
SEEK OPERATION — S2
S3 STOPPED AT INNER STOPPER ? — NO (return to S2) / YES
READ PHYSICAL CYLINDER ADDRESS FROM DISK — S4
DETERMINE OFFSET VALUE (N) — S5
GENERATE TRANSLATION TABLE BETWEEN PA AND LA — S6
STORE TRANSLATION TABLE IN MEMORY — S7
END

| PHYSICAL CYLINDER ADDRESS (PA) | LOGICAL CYLINDER ADDRESS (LA) |
|---|---|
| N | 0 |
| N+1 | 1 |
| ⋮ | ⋮ |

19

DISK DRIVE HAVING POSITIONING CONTROL SYSTEM USING LOGICAL CYLINDER ADDRESS INFORMATION

CROSS-REFERENCE TO RELATED APPLICATIONS

This application is based upon and claims the benefit of priority from the prior Japanese Patent Application No. 11-366758, filed Dec. 24, 1999, the entire contents of which are incorporated herein by reference.

BACKGROUND OF THE INVENTION

The present invention relates to a disk drive having a system for performing head positioning control with the use of servo data recorded on a disk in particular.

Conventionally, in a hard disk drive (HDD), servo data is recorded on a disk used as a data recording medium. The servo data is used to control the positioning of a head to a target position (target cylinder or target track) over a disk. A servo area with.the servo data recorded thereon is such that, in many cylinders (also called as tracks) formed in a radial direction on the disk, the servo area is situated in the same position in the radial direction and at predetermined intervals in a circumferential direction. In other words, the many cylinders on the disk are formed with the servo data (servo area) used as a reference, the servo data being written by a servo write step included in the manufacturing process of the HDD.

It is desirable that, in order to increase a recording capacity in the HDD, as many cylinders as possible be formed on a restricted radial-direction data recording range on the disk by utilizing a high precision head positioning control system using the servo data.

In the manufacturing process of the HDD, the servo write step is carried out after a head disk assembly (HDA) has been incorporated into a drive body. In the servo write step, the servo data is recorded on the disk mounted on a spindle motor with the use of a dedicated device called as a servo track writer. The servo track writer has a means for detecting a head moving range defined by inner- and outer-circumference-side stoppers mounted on a drive body and it is possible to set a radial area corresponding to an effective data recording area on the disk. It is, therefore, possible to set the radial area corresponding to the effective data recording area on the disk so as to conform to an assembling accuracy of a drive mechanism such as an HDA.

In order to achieve a high efficiency of the HDD assembling process and an increased recording capacity of the disk, it is desirable that a disk with servo data initially recorded thereon be incorporated into the drive mechanism. In this case, there is no servo write process and the disk is prepared with the servo data already recorded thereon, so that the disk be incorporated into the drive body in the assembling step of the drive mechanism.

In this method, however, it is necessary to take, into consideration, a variation arising from the assembling accuracy of the drive mechanism such as an HDA. If, therefore, the radial area is set in a way to correspond to the effective data recording area on the disk, a margin has to be provided, so that an actually utilizable data recording area is restricted. Even if, therefore, the servo data is recorded on the disk before the step of an assembly into the drive body so as to increase the effective data recording area, an actually available data recording area is restricted, thus making it difficult to achieve an increased memory capacity.

BRIEF SUMMARY OF THE INVENTION

It is accordingly the object of the present invention to provide a disk drive which, even if the method of assembling a disk with servo data initially recorded thereon into a drive mechanism is adopted, can easily achieve an increased recording capacity.

According to the present invention there is provided a disk drive comprising: a disk having a cylinder group in a radial direction, each cylinder having a data area recorded with data and servo area initially recorded with physical cylinder address information for identifying the cylinder; a head actuator for holding a head for reading and writing data from and into the disk and moving the head to a target position on the disk; generating means for setting an effective cylinder group contained from the cylinder group and generating logical cylinder address information so defined as to correspond to the physical cylinder address information for identifying each cylinder contained in the effective cylinder group; and control means for, when the head is positioned to a target position on the disk, allowing the generating means to find first physical cylinder address information corresponding to the target position with the use of the logical cylinder access information corresponding to the target position and allowing the driving control of the head actuator so as to be equal the first physical cylinder address information and second physical cylinder address information read out by the head from the disk.

According to the disk drive thus structured, after the disk with servo data initially recorded thereon has been incorporated into the drive mechanism, it is possible to set the effective data recording range on the disk so as to conform to the accuracy, etc., of the drive mechanism. That is, based on the initially recorded servo data, many cylinder groups are formed in the radial direction on the disk. These many cylinder groups can be identified by the physical cylinder address information contained in the servo data. From the many cylinder groups, the effective cylinder group contained in the effective data recording range is set and the logical cylinder address information is allocated so as to identify each cylinder in the effective cylinder group. That is, the logical cylinder address information is so defined as to correspond to the physical cylinder address information for identifying each cylinder contained in the effective cylinder group.

The disk drive of the present invention controls the effective cylinder group on the disk with the use of the logical cylinder address information. In the head positioning control at a data access time, the control means finds first physical cylinder address information corresponding to the target position with the use of the logical cylinder address information corresponding to the target position of the head. Further, the control means performs driving control of the head actuator on the basis of the first physical cylinder address information and second physical cylinder address information read out by the head from the disk and locates the head to the target position.

According to the present invention, if the disk with the servo data initially recorded thereon is incorporated into the drive body, it is not necessary to take, into consideration, a margin for a variation in assembling accuracy of the drive mechanism. That is, an effective cylinder group contained in the effective data recording range is set from the cylinder group on the disk in accordance with the assembling accuracy of the actual drive mechanism. By doing so, it is possible to set a maximal-limit effective cylinder group from the cylinder group on the disk and promote an increased memory capacity. Since it is possible to use the disk having the servo data initially recorded thereon, it is possible to achieve an improved efficiency of a disk drive assembling process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the present invention will be explained below with reference to the accompanying drawing.

(Structure of Disk Drive)

Figure 1:
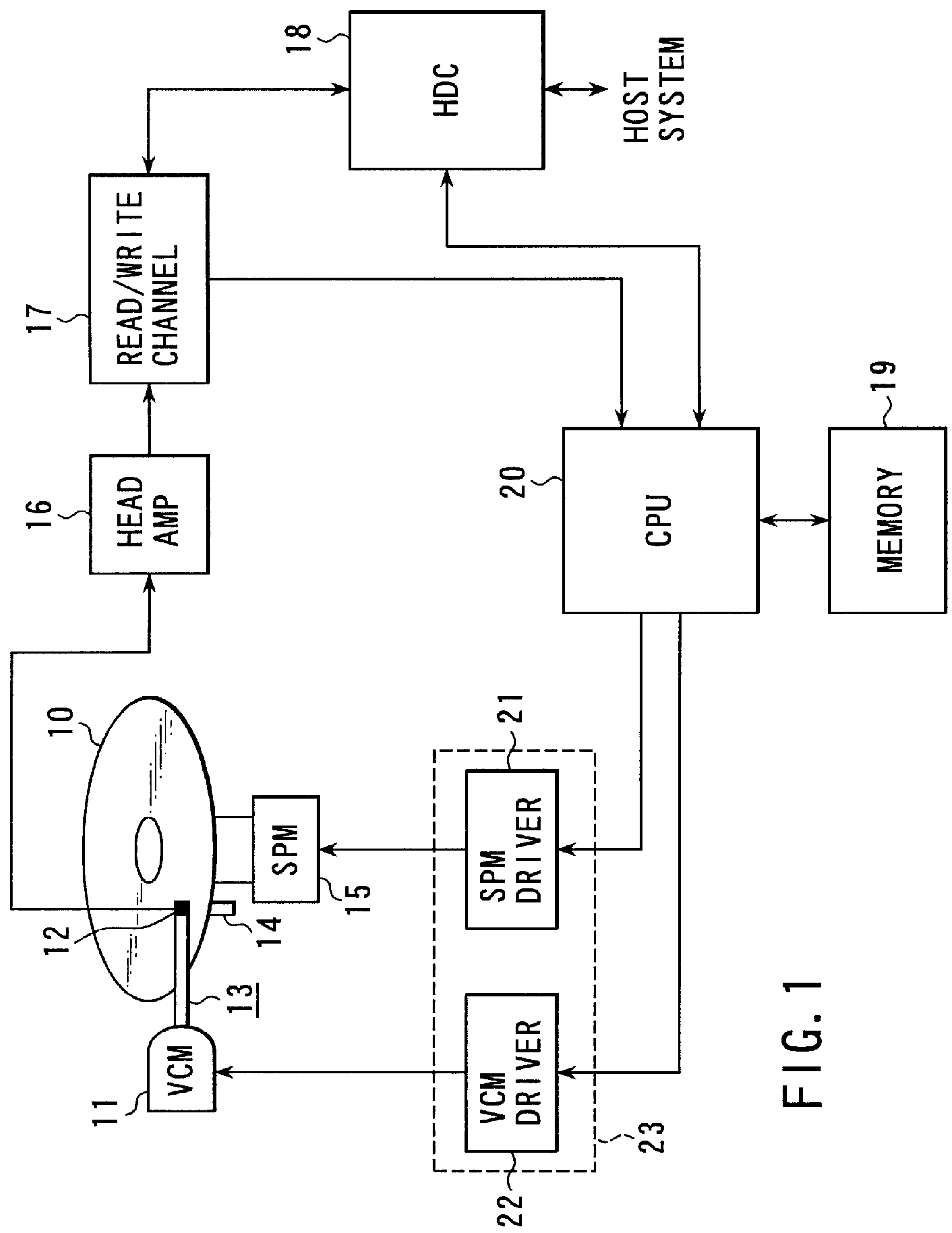
FIG. 1 is a block diagram showing a major section of a disk driver relating to an embodiment of the present invention.

A disk drive of the present embodiment has, as shown in FIG. 1, a disk 10 comprised of a data recording medium, a head 12 for performing a data read/write operation, and an actuator 13 for holding the head 12. The head 12 comprises a slider constituting a body and a read head element and write head element mounted on the slider. Here, for convenience in explanation, the disk 10 is shown as one disk only and the head 12 is arranged only on one surface side of the disk.

Figure 4:
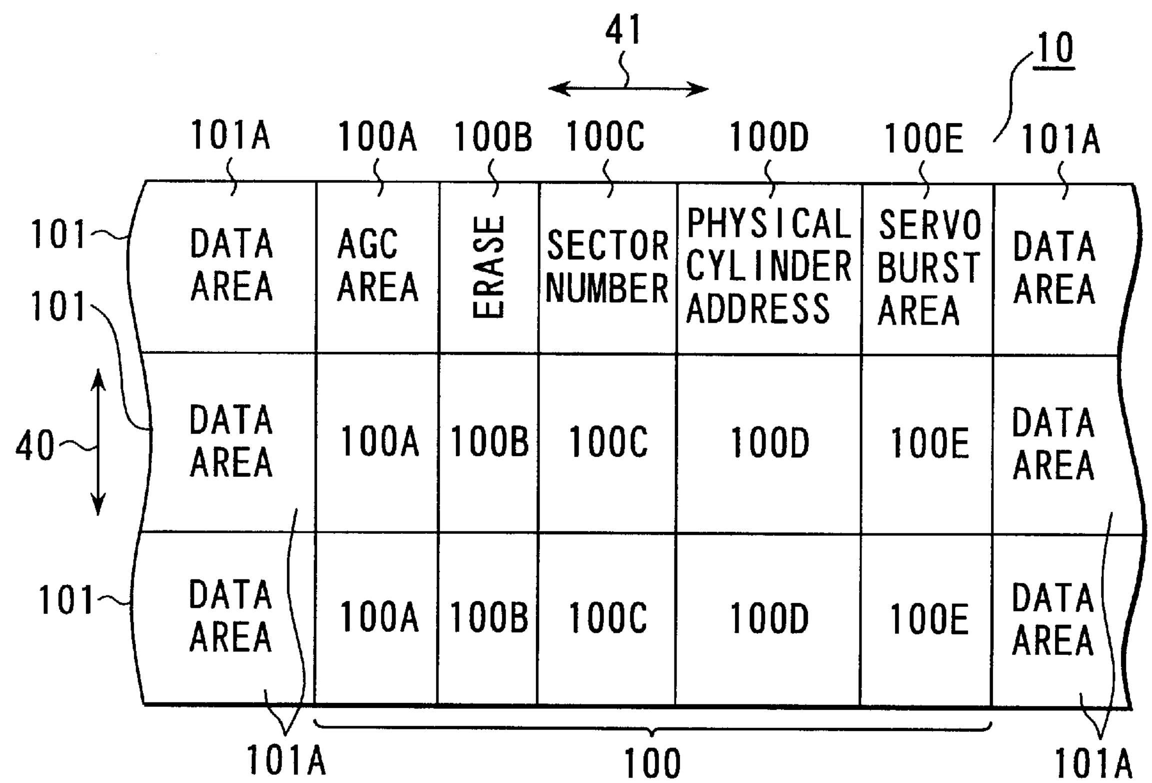
FIG. 4 is a view showing a cylinder format relating to the present embodiment.

As shown in FIG. 4, many concentric cylinders (data tracks) 101 are arranged in a radial direction (arrow 40) on each surface of the disk 10. The respective cylinders 101 are such that their servo areas 100 arranged at predetermined equidistant intervals in a circumferential direction (arrow 41) are set as a reference. The respective cylinders 101 are also such that a plurality of data areas (data sectors) 101A are arranged relative to the servo area 100. The data areas 101A constitute record areas of user data read/written by the head 12.

In this embodiment it is assumed that, before being incorporated into the disk drive, the servo areas 100 with servo data recorded thereon are provided on the disk 10. Thus, many cylinders 101 groups are formed in the radial direction on the disk 10, before an assembling step, on the basis of the respective servo area 100.

The servo data is used to controllably position the head 12 over the disk 10 to a target place (target cylinder or target track). The servo data in a narrower sense of the word comprises a sector number 100C for identifying a servo sector, physical cylinder address information 100D and servo burst data 100E. The servo sector shows a range of the data area 101A with the servo area as a reference. The physical cylinder address information 10D constitutes information (cylinder number or cylinder code) for identifying each cylinder. Usually, with the cylinder arranged at the outermost circumference side of the disk 10 being set as a reference cylinder, the physical cylinder address information 100D of a cylinder number "0" is set. The servo burst data 100E constitutes a burst pattern for detecting a position (in actuality, a position error with a center as a reference position) of the head 12 in a range of the respective cylinder. The servo area 100 contains not only an area recorded with the servo data in the narrower sense of the word but also an AGC area 100A recorded with an AGC (automatic gain control) signal pattern and an erase area 100B.

Figures 2, 3:
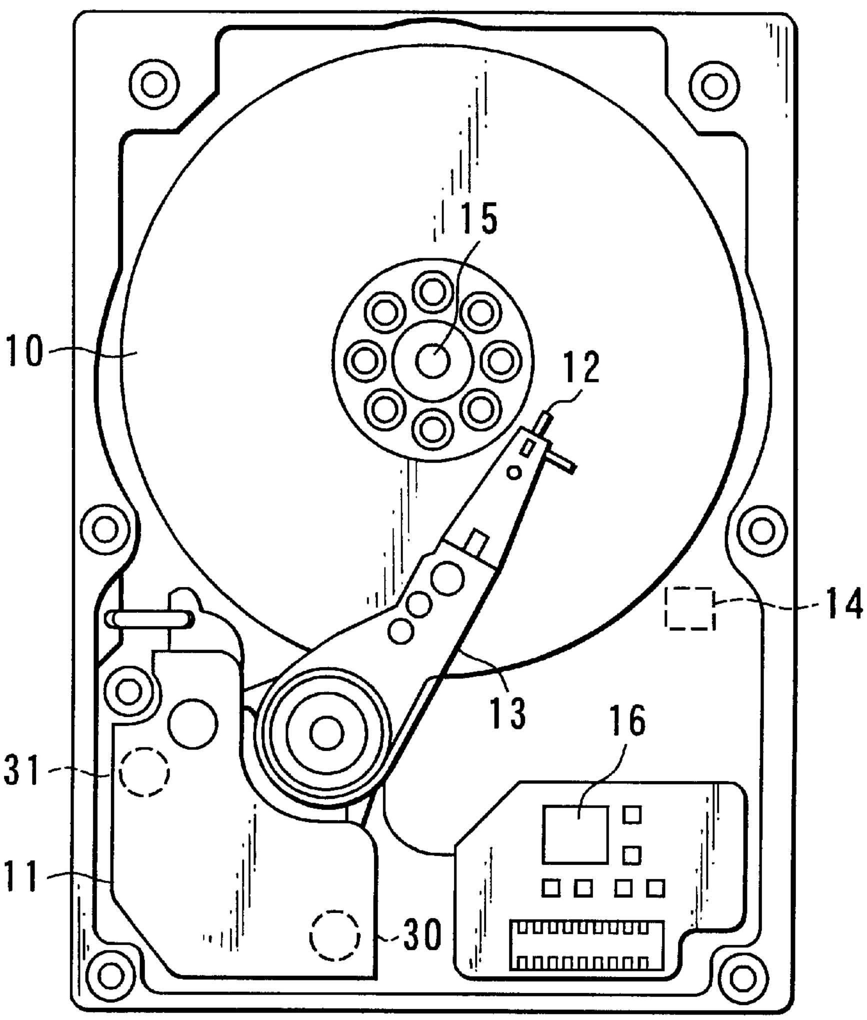
FIG. 2 is a view showing a disk drive mechanism relating to the embodiment of the present invention.
FIG. 3 is a view showing a translation table relating to the present embodiment.

The head 12 is mounted, as shown in FIG. 2, at a forward end of a rotary type actuator 13. The actuator 13 has a suspension for retaining the head 12 and is rotationally moved in the radial direction on the disk by a driving force of a voice coil motor (VCM) 11. By the drive control of the actuator 13, the head 12 is moved to the target cylinder on the disk 10 and set in position. The actuator 13 is restricted, by an inner circumferential side stopper member 30 and outer circumferential side stopper member 31, in a radial area in which the disk 10 is movable. A ramp member 14 is arranged near the outermost circumferential side of the disk 10 to allow the head 12 to be retracted. The ramp member 14 constitutes a member for holding the head 12 unloaded from above the disk 10. Thus, the movable range of the head 12 is situated between the inner circumferential side cylinder position on the disk 10 restricted by the inner circumference side stopper member 30 and the position of the ramp member 14. By doing so, an effective data recording area defined on the disk 10 is set (see FIG. 5).

The disk 10 is rotated at high speeds by a spindle motor (SPM) 15. The SPM 15 is driven by a drive current supplied from an SPM driver 21. A VCM 11 is driven by a drive current supplied from a VCM driver 22. The SPM driver 21 and VCM driver 22 are built as an IC version, that is, as a one-chip driver IC 23.

The head 12 is connected to a head amplifier IC 16 mounted on an FPC (flexible printed circuit board). The head amplifier IC 16 has a read/write amplifier as shown in FIG. 1 and a read signal from the head 12 is amplified by the read amplifier and the amplified signal is sent to a read/write channel 17. Further, the head amplifier IC 16 allows write data which is output from the read/write channel 17 to be converted by a write amplifier to a write current. The write current is fed to the head 12.

The read/write channel 17 has an AGC (automatic gain control) amplifier for allowing a read signal which is supplied from the head amplifier IC 16 to be maintained at a predetermined level, a decode circuit for allowing the above-mentioned read signal to be decoded to, for example, data of an NRZ code, an encoding circuit for generating write data for being written into the disk 10, a servo circuit for extracting servo data from the read signal, etc. The read/write channel 17 delivers servo data to a CPU 20 to allow the read/write data to be exchanged to and from the disk controller (HDC) 18.

The CPU 20 is a microprocessor constituting a main control unit (also called a microcontroller) for performing various kinds of control of the disk drive in accordance with a control program stored in a memory 19. The CPU 20 performs head positioning control, including cylinder address conversion processing relating to the present embodiment, data read/write control, etc. It is to be noted that the memory 19 is intended to mean a memory group including a RAM, ROM and nonvolatile flash memory. A later-described translation table is stored in the flash memory in the memory 19.

(Cylinder Address Conversion Operation and Translation Table Generation)

The cylinder address conversion operation and translation table generation process of the present embodiment will be explained below with reference to not only FIGS. 1 and 2 but also FIGS. 3 to 6.

In the assembling step of the disk drive of the present embodiment, as set out above, the servo area 100 with the servo data recorded thereon is formed on the disk 10 before the disk is incorporated into the drive body. In this connection it-is considered that many of cylinders groups 101 are constituted (see FIG. 4).

Such disk 10 is incorporated into the drive mechanism as shown in FIG. 2. On the disk 10 immediately after being so incorporated, as being conceptually shown in FIG. 5, an initialized cylinder group is provided in a data recordable range (SB) from an outermost circumference side reference cylinder (Physical cylinder address information PA is set to 0) in a center 50 direction (radial direction 40) to an innermost circumference side cylinder. This data recordable range (SB) constitutes a m axim ally set data recording area from a standpoint of a design consideration. In actuality, as will be set out below, an actually effective data recording area (SC) is set from a relatively wide range data recording area (SB) in accordance with the accuracy, etc., of the drive mechanism.

Figure 6:
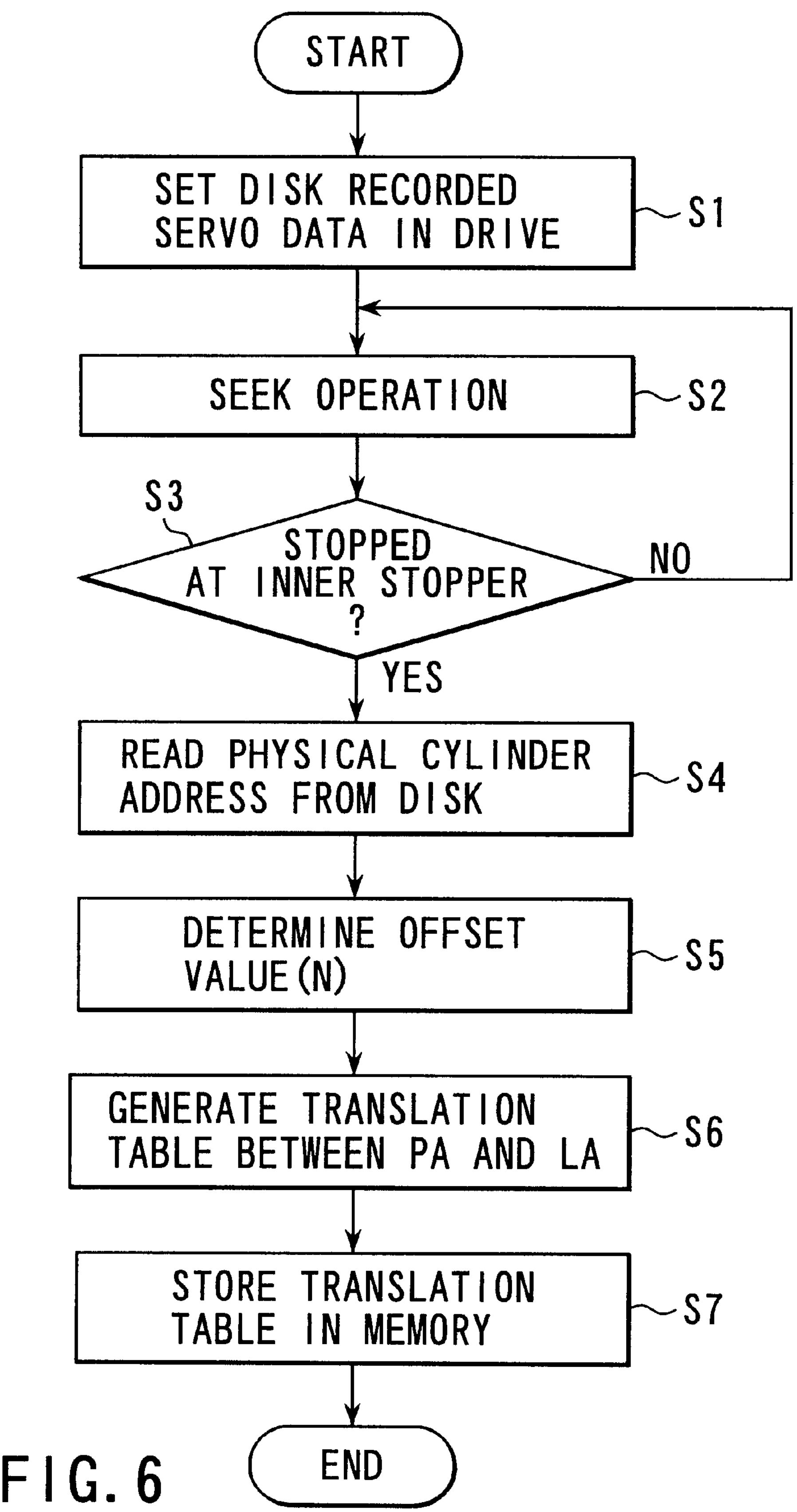
FIG. 6 shows a flow chart for explaining a cylinder address conversion operation relating to the present embodiment.

Hereinbelow, with reference to a flow chart of FIG. 6, an explanation will be made about the process with the disk 10 set on the drive.

First, a disk 10 with servo data initially recorded thereon is set in the drive (step S1). The CPU 20 controls the drive of the SPM 15 to rotate the set disk 10 (step S1). Then the CPU 20 controls.the driving of the VCM 11 through the VCM driver 22 to move the actuator 13 in a radial direction (an arrow 40 in FIG. 5) over the disk 10 (step S2). At this time, depending upon the assembling accuracy of the drive mechanism, the moving range of the actuator 13 is restricted to a range defined by the outer circumference side stopper member 31 and inner circumference side stopper member 30.

Here, the CPU 20 executes a seek operation to allow a movement of the actuator 13 to the innermost side of the disk 10 from the ramp member 14 arranged near the outermost circumference of the disk 10 (step S3). And the CPU 20 decides a movable range (SA) of the head 12 in the moving of the actuator 13. This movable range (SA) is set, as a range (narrower than the initially set range SB) as shown in FIG. 5, from the outermost circumferential side position (RP) on the disk 10 to the position (IS) of the head where the actuator 13 is restricted by the inner circumference side stopper member 30.

The CPU 20 sets the effective data recording range (SC), while considering a predetermined margin, from the movable range (SA) of the head 12 which depends upon the assembling accuracy of the drive mechanism. The CPU 20 control the positioning of the head 12 to the outermost circumference side cylinder position 51 of the effective data recording range (SC) and reads out the physical cylinder address information (PA) from the servo area of the cylinder (step S4). Similarly, the CPU 20 controls the positioning of the heads 12 to the innermost circumference side cylinder position 52 of the effective data recording range (SC) and reads out the physical cylinder address information (PA) from the servo area of the cylinder.

Then the CPU 20 sets, as an effective cylinder group, a cylinder group contained in the effective data recording range (SC) set on the disk 10 to allow an allocation of a logical cylinder address information (LA) for identifying each cylinder in the effective cylinder group. That is, apart from the physical cylinder address information (PA) allocated to the existing cylinder group contained in the data recording area (SB) initialized on the disk 10, the CPU 20 allows an allocation of logical cylinder address information (LA) for identifying the cylinder group contained in the effective data recording range (SC). The CPU 20 generates a translation table for obtaining a correspondence between the logical cylinder address information (LA) and the physical cylinder address information(PA)-step S6.

Figure 5:
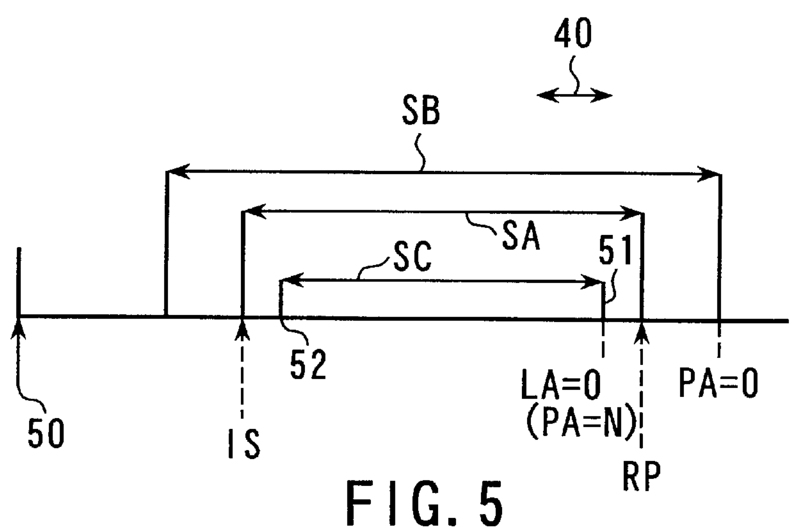
FIG. 5 is a view for explaining a cylinder address conversion processing relating to the present embodiment.

Stated in more detail, from the outermost circumference side cylinder 51 of the effective data recording range (SC), the CPU 20 allows the physical cylinder address information (PA=N) which is read out from the head 12 and the logical cylinder address information (LA=0) as a reference cylinder number to be set-see FIG. 5. Further, the CPU 20 determines an offset value (N) showing a conversion relation between the physical cylinder address information (PA) and the logical cylinder address (LA)-step S5. This offset value (N) is found from a relation ⌈LA=PA−N⌋ and stored in the memory 19. Based on such processing, the CPU 20 generates a translation table, as shown in FIG. 3, for obtaining a correspondence between the logical cylinder address information (LA) for identifying the cylinder group contained in the effective data recording range (SC) and the inherent physical cylinder address information (PA). And the CPU 20 allows the generated translation table to be stored in the flash memory in the memory 19-step S7.

It is assumed that, in the above-mentioned embodiment, the table 10 is prepared with the servo data initially recorded and with the cylinder group formed in the maximal range (SB) assumable from the design consideration. And the disk 10 is incorporated in the desk drive. With the disk 10 incorporated in the drive, based on the mechanical specification and assembling accuracy of the drive mechanism, the CPU 20 sets the effective data recording area SC actually usable on the disk 10.

The effective cylinder group contained in the effective data recording area SC constitutes a cylinder group actually usable from a host system and it is necessary to allocate the logical cylinder address information (LA) apart from the existing physical cylinder address information (PA). In the case where, on the drive side, the head 12 is positioned to a target cylinder on the disk 10 in accordance with the data access from the host system, the existing physical cylinder address information (PA) is necessary to specify the physical position of the target cylinder. To this end, the disk drive of the present invention is such that, with the logical cylinder address information (LA) and physical cylinder address information (PA) mutually taking a correspondence, it generates a mutually convertible translation table and allows it to be stored in the memory 19.

A detailed explanation will be made below as to how to use the translation table.

If the target cylinder (set by the logical cylinder address (LA)) on the disk 10 is determined in accordance with the data access from the host system, the CPU 20 refers to the translation table stored in the memory 19 and finds actual physical cylinder address information (PA) corresponding to the target cylinder. The CPU 20 controls the driving of the actuator 13 and, while allowing the head 12 to be moved in the radial direction of the disk 10, confirms the moving position of the head 12 with the physical cylinder address information (PA) read out by the head 12. The CPU 20 performs such feedback control as to cancel an error between the moving position of the head 12 and the target position (target cylinder) of the head 12 and, by doing so, the head 12 is positioned to the target cylinder.

The way of setting the offset value (N) will be explained in more detail below.

The offset value (N) differs at each driving and each disc surface due to the assembling accuracy of the disk 10, that is, the assembling accuracy of the inner and outer circumstance side stoppers 30 and 31 and assembling accuracy of the actuator 13 in particular of the HDA, and distance variation between the rotation center of the SPM 15 and the pivot center of the actuator 13, as well as the eccentricity of the disk 10, assembling accuracy, etc.

From this view point, the CPU 20 allows an offset DC current to be supplied to the VCM 11 and, with the actuator 13 set in contact with the inner circumference side stopper member 30 or outer circumference side stopper member 31, allows the head 12 to read out the physical cylinder address information (PA) from the disk 10. At this time, the head 12 reads out the physical cylinder address information (PA) corresponding to at least one circumference of the disk 10 and the CPU 20 calculates either of its average value, maximal value and minimal value. Based on either of the average value, maximal value and minimal value of the physical cylinder address information (PA), the CPU 20 determines an offset value (N) showing a relation (LA=PA−N) between the above-mentioned physical cylinder address information (PA) and the logical. cylinder address (LA).

It is to be noted that, for a disk drive not equipped with the ramp member, that is, a disk drive using a CSS (contact start stop) system it is possible to set the offset value (N) with the use of the outer circumference side stopper member 31.

Incidentally, it may be possible to set the logical cylinder address information (LA) from address information corresponding to the physical cylinder address information contained in an access command from the host system and to do so with the use of the offset value (N) stored in the memory 19 with the use of the translation table, the CPU 20 finds the physical cylinder address information (PA) representing an actual physical cylinder position from the logical cylinder address information (LA) corresponding to a target cylinder as an object to be accessed.

According to the present invention, as set out in detail above, a disk can be prepared with servo data initially recorded thereon and with a cylinder group corresponding to a design specification's maximal limit recording capacity set and it is possible to adopt the step of assembling such a disk into the disk drive. That is, it is possible to set an actually usable data recording area on the disk in accordance with the assembling accuracy, etc., of the drive mechanism after the disk is assembled into the drive body and set an effective cylinder group contained in the data recording area. To sum up, it is not necessary to initially pay consideration to an accuracy variation of the drive mechanism and set a usable data recording area with a margin and it is possible to maximally set an effective cylinder group based on an actually head movable range. It is, therefore possible to achieve the efficiency of a step of assembling the disk drive and to increase the recording capacity of the disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:

a disk having a cylinder group in a radial direction, each cylinder having a data area recorded with data and servo area initially recorded with physical cylinder address information for identifying the cylinder;

a head actuator for holding a head for reading and writing data from and into the disk and moving the head to a target position on the disk;

generating means for setting an effective cylinder group contained from said cylinder group and generating logical cylinder address information so defined as to correspond to the physical cylinder address information for identifying each cylinder contained in the effective cylinder group; and control means for, when the head is positioned to a target position on the disk, allowing the generating means to find first physical cylinder address information corresponding to the target position with the use of the logical cylinder access information corresponding to the target position and allowing the driving control of the head actuator so as to be equal the first physical cylinder address information and second physical cylinder address information read out by the head from the disk.

2. A disk drive according to claim 1, wherein said generating means generates a translation table for obtaining a correspondence between the physical cylinder address information for identifying the respective cylinder contained in the effective cylinder group and the logical cylinder address information.

3. A disk drive according to claim 2, further comprising memory means for storing the translation table and wherein, when the head is positioned to the target position on the disk, said control means finds the first physical cylinder address information corresponding to the target position from the translation table stored in said memory means with the use of logical cylinder address information corresponding to the target position and controls the driving of said head actuator on the basis of said first physical cylinder address information and second physical cylinder address information read out by the head from the disk.

4. A disk drive according to claim 1, wherein said generating means defines, as an offset value, an error between a reference cylinder value of the physical cylinder address information corresponding to a reference cylinder of all cylinder group formed on the disk and a cylinder value of physical cylinder address information corresponding to a reference cylinder of the effective cylinder group, and sets the reference cylinder of the effective cylinder group as a reference value of logical cylinder address information on the basis of the offset value and physical cylinder address information read out by the head, and generates a translation table for obtaining a correspondence between the physical cylinder address information for identifying each cylinder contained in the effective cylinder group and the logical cylinder address information.

5. A disk drive according to claim 1, wherein said generating means has offset value calculating means for finding an offset value generated between the logical cylinder address information and the physical cylinder address information on the basis of physical cylinder address information when the head is moved to an outermost circumference side position or innermost circumference side position in a movable range over the disk, and determines the logical cylinder address information on the basis of the offset value and physical cylinder address information and generates the translation table.

6. A disk drive comprising:

a disk having a cylinder group in a radial direction, each cylinder having a data area recorded with data and servo area initially recorded with physical cylinder address information for identifying the cylinder;

a head actuator for holding a head for reading and writing data from and into the disk and moving the head to a target position over the disk;

memory means for storing a translation table, the translation table being provided for obtaining a correspondence between the physical cylinder address information for setting an effective cylinder group contained from the cylinder group and identifying each cylinder contained in the effective cylinder group and logical cylinder address information for defining each cylinder contained in the effective cylinder group used as a reference value; and control means for, when the head is positioned to a target position over the disk, allowing first physical cylinder address information corresponding to the target position to be found from the translation table stored in the memory means with the use of logical cylinder address information corresponding to the target position, controlling the driving of the head actuator so as to be equal the first physical cylinder address information and second physical cylinder address information read out by the head from the disk and positioning the head to a target position.

* * * * *

UNITED STATES PATENT AND TRADEMARK OFFICE
CERTIFICATE OF CORRECTION

PATENT NO. : 6,522,497 B1
DATED : February 18, 2003
INVENTOR(S) : Kitagawa

It is certified that error appears in the above-identified patent and that said Letters Patent is hereby corrected as shown below:

Title page,
Item [57], ABSTRACT,
Line 14, change "finds-" to -- finds --.

Column 8,
Line 57, change "group" to -- groups --.

Signed and Sealed this

Thirteenth Day of May, 2003

JAMES E. ROGAN
*Director of the United States Patent and Trademark Office*